Nov. 8, 1927.

LE ROY MARTIN

BATTERY CONNECTION FOR MOTOR VEHICLES

Filed Jan. 12, 1927

1,648,617

LeRoy Martin INVENTOR.

BY Loyal J. Miller
ATTORNEYS.

Patented Nov. 8, 1927.

1,648,617

UNITED STATES PATENT OFFICE.

LE ROY MARTIN, OF OKLAHOMA CITY, OKLAHOMA.

BATTERY CONNECTION FOR MOTOR VEHICLES.

Application filed January 12, 1927. Serial No. 160,734.

My invention relates to improvements in battery connection for motor vehicles.

The object of my invention is to provide a device of the character described, which will be new, useful, novel and of utility; which will be easy to install and to remove; which will be easily and cheaply manufactured, constructed and maintained; which will be simple, strong and durable; which will not be damaged by the acid and chemicals of the battery; which will eliminate the forming of all corrosions, disintegrations, hard crustings, and the like that ordinarily form around brass, or copper terminals at the positive posts; which will have very few parts exposed to the effects or affected by the acids and chemicals of the battery in any way, and these are so formed and constructed that they can be easily removed and easily and cheaply replaced; which is so formed that the flange at the top of the cleats and the extra thickness of the metal at the top of the terminal body forces the bottom of the cleats to bite on the battery post at the bottom; which will prevent the necessity of burning on the new terminals.

It is generally known to those familiar with the art to which my invention pertains that the contents of the commonly used batteries is constantly seeping out or overflowing and corroding, causing a stiff or crusty sediment over the outside surface of the battery, and that this injures the battery and its connections and requires the burning on of new terminals. All of this and other defects of the present systems of connections are relieved and remedied by the use of the present invention.

Figure 1:
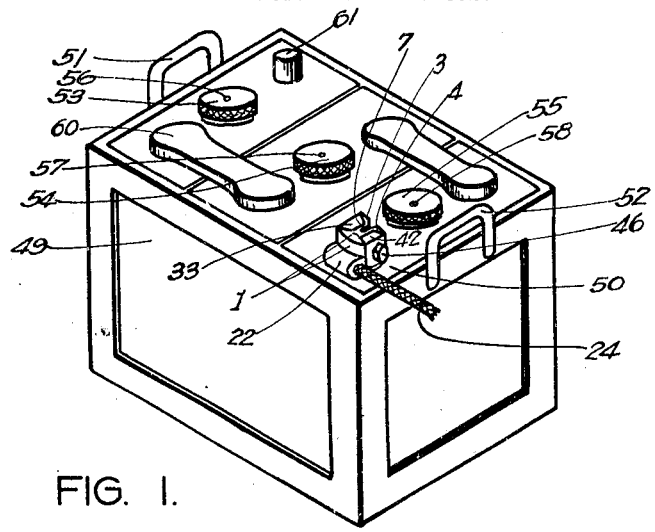
Figure 2:
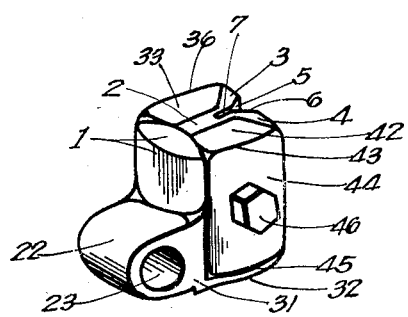
Figure 4:
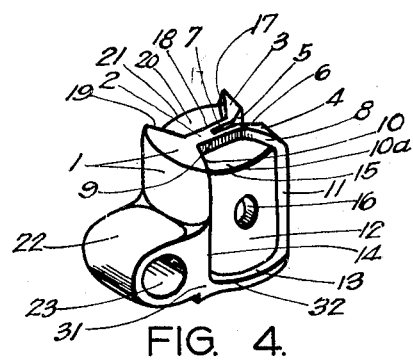
Figure 3:
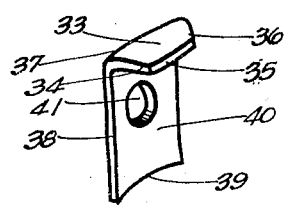
Figure 5:
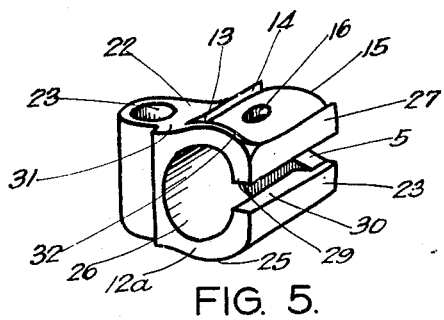
Figure 6:
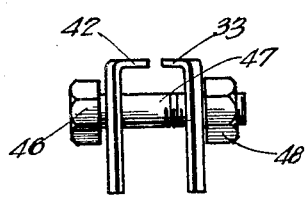

With the above and other objects in view as will more fully appear from the specification, claims, and drawing, my invention consists in the details of construction and combination of parts more fully hereinafter described. One construction embodying one form of my invention is shown in the accompanying one sheet drawing, of which, Figure 1 is a perspective view of a battery showing the terminal connections installed on one of the battery terminals, or posts; Fig. 2 is a perspective view of the terminal connection assembled; Fig. 3 is a perspective view of a metallic flanged cleat covered with lead; Fig. 4 is a perspective view of the terminal body; Fig. 5 is a perspective view of the under side of the terminal body;

Fig. 6 is a view of the cleats and bolt assembly.

Like characters of reference designate like parts in all the figures.

I accomplish the results sought to be brought about by my invention as follows:

I provide a terminal body 1 composed of lead of suitable weight according to the size of the battery; the top 2 thereof is in practically the form of a Y having upper and outwardly extending arms 3, 4, and cut-away beveled portions 5, 6, on the inner surfaces of said upper arms, and a groove or slot 7 at the union of said portions cut down into the lower stem of said Y-shaped top. At the right of said Y-shaped top portion is a cut-away portion 8, 9, 10, forming a secondary top portion 10ª, and on the side therebelow a similar cut-away portion 11, 13, 14, forming a side wall 12, the line between said top portion 10ª and said side wall 12 forming a shoulder 15; said side wall 12 has a central perforation 16 therethrough below said top portion 10ª and at such a point as to be above the terminal posts hereinafter referred to; a similar cut-away portion and a similar top portion, and a similar side wall to the ones above described are on the left side of said Y-shaped top portion 2 as are partially shown at 17, 18, 19, 20 and at shoulder 21; said secondary side wall also has a central perforation in line with perforation 16 both perforations adapted to receive a bolt 47, hereinafter referred to, therethrough; at the outer edge of said body 1 near its bottom is an outstanding lug 22 having a lateral perforation 23 therethrough, adapted to receive one end of a battery wire 24, and to contact one of the battery posts; the flat bottom 25 of said body 1 surrounds a central bore 26 therein and fits down flat upon the top face 50 of the battery 49, and said bore 26 is adapted to surround one of the terminal posts of said battery; the front of said body has two flat surfaced front faces 27, 28, with a space between them, the walls surrounding said space having flat surfaces 29, 30, at right angles to said surfaces 27, 28; the lower outside surface 31 of said body 1 forms a shoulder 32 between said surface 31 and said ledge 13.

I also provide two cleats made of iron, or other suitable metal, coated with lead. These are similarly formed and used, respectively, one on each side of the said body 1, and adapted to fit in the cut-away portions thereof. As will be best shown in Fig. 3, the cleat has a shoulder 37, and an inwardly extending and tapering flange top 33, its side edges 34, 36, and its innermost edge 35 fit the oppositely shaped edges 17, 19 and 18; the underside of top 33 fits snugly on said secondary top 20; its outer vertical edges (not numbered) fit, respectively, the cut-away beveled edges of said top 20 (not numbered) but similar to like portions shown at 11, 13, 14. Each of said cleats has a central perforation adapted to be used in line with each other, one such perforation is shown at 41; these are also adapted to fit conjugately perforation 16, and a similar perforation in the opposite wall of said body (not shown); a bolt 47 with a head 46 and a nut 48, preferably coated with lead is adapted to pass through said perforations in said cleats, and the perforations in said side walls 12 and 12ª, and to hold said cleats securely to the walls of said body and said body snugly around the terminal post of a battery such as is shown at 49. Said battery is the usual form of battery varying in size according to its demand and the make, having the usual handles 51, 52, acid caps 53, 54, 55, with vent holes 56, 57, 58, connecting plates 59, 60, and terminal post 61 and a second terminal post not shown in the drawing as it is covered up by the applied battery connection. The flange 33 at the top of said cleat, the extra thickness of the metal at the top of the terminal body, the thinner walls of the terminal body at its bottom, and the strength of the metallic cleats, bolt and nut, forces the bottom of the cleat as shown at the bottom 39 to press against the lower bottom walls of said body, and causes the walls in turn to bite on the battery post surrounded by said walls.

From the description of the accompanying one sheet drawing, the specification and the claims, the advantages of the construction, application of the parts and the combinations thereof, will be apparent to those familiar with the art to which my invention pertains. I have entered into a detailed description of the construction and the relative arrangement of the parts embraced in the present embodiment of my invention in order to impart a full, clear and exact understanding of said embodiment. I do not desire, however, to be understood as confining myself to the specific construction and relative arrangement of the parts inasmuch as in the future practice of the invention various changes and modifications may be made such as fall within the scope of my invention without departing from the principle thereof.

Having thus described the invention, what is claimed and desired to be secured by Letters Patent, is:

1. A battery connection, for batteries of motor vehicles, of the character described, comprising a hollow lead body having a vertical opening in its face with a groove extending inwardly from the top of said open face to the top central portion of said body, said body having a lower rearwardly extending portion with a lateral channel therethrough, and having two side walls with outside depressed portions therein with a central perforation through each, each portion having an upper shoulder beveled towards its inner end; two curved upstanding cleats each having a central perforation therein and a flanged inwardly extending shoulder at its top the side edges beveled towards its inner end; said cleats and their flanged shoulders adapted to fit said depressed portions and their shoulders; a lead-coated threaded bolt, a lead-coated threaded nut, said bolt adapted to penetrate said perforations in said side walls and in said cleats, said nut adapted to fit on the threaded end of said bolt, and said bolt and said nut adapted to hold said cleats and said body securely together and to bind said body on the terminal post of a battery; said lateral channel in said rearwardly extending lower portion adapted to receive and to securely hold one end of a battery cable and to contact said cable and said terminal post.

2. A battery connection, as described, comprising a lead body having a central lower bore, an open face, side walls with depressed portions and perforations therethrough, a lower integral rearwardly extending portion with a lateral channel therethrough; two metallic cleats adapted, respectively, to fit in said depressed portions having a perforation in each, a metallic bolt and nut adapted to fit said perforations and to hold said cleats and said body securely together and to securely grip a terminal post of a battery, said channel adapted to receive and to securely hold one end of a battery cable and to contact said cable and said terminal post.

3. A battery connection, as described, comprising a lead body having a hollowed out bore below its top, two side face surfaces with a vertical opening therebetween, the surfaces of the top walls from the top portions of said face surfaces extending rearwardly toward a common center and terminating in a narrow groove near the center of the top of said body, said body having an integral lower rearwardly extending portion with a lateral channel therethrough adapted to receive and to be securely fastened to the end of a battery cable and to contact it with a terminal post of a battery, two side walls with outside depressed portions therein with a central perforation through each, each portion having an upper shoulder beveled towards its inner end; two curved upstanding metallic cleats coated with lead each having a perforation centrally therethrough and a flanged inwardly extending shoulder at the top side edges thereof beveled towards its inner end; said cleats and their shoulders adapted to fit said depressed portions and their shoulders; a metallic lead-coated threaded bolt, a metallic lead-coated threaded nut, said bolt adapted to penetrate said perforations in said side walls and in said cleats, said nut adapted to fit on the threaded end of said bolt, and said bolt and said nut adapted to hold said cleats and said body securely together and to bind said body on the terminal post of a battery.

LE ROY MARTIN.